Patented June 6, 1944

2,350,583

UNITED STATES PATENT OFFICE 2,350,583

DRYING OILS

Theodore F. Bradley, Stamford, Conn., assignor to American Cyanamid Company, New York, N. Y., a corporation of Maine No Drawing. Application February 8, 1941, Serial No. 378,060

3 Claims. (Cl. 260—405.6)

This invention relates to improvements in drying oils and the higher fatty acids which they contain. The invention includes the preparation of such oils by isomerizing polyunsaturated higher fatty acids to bring about a relatively high content of conjugated double bonds therein followed by esterification of the isomerized acids with a polyhydric alcohol. The invention also includes a new and improved method of isomerizing polyunsaturated fatty acids as well as certain new drying oils prepared therefrom.

It is known that the drying properties of polyunsaturated higher fatty acids, when employed in the form of triglycerides, oil-modified alkyd resins and the like, are influenced by the positions of their double bonds with respect to each other. If these double bonds are in conjugation (i. e. separated by only one single bond) the oil has better drying properties than a similar oil having an equal number of non-conjugated double bonds. Thus, for example, tung oil dries faster than linseed oil because the three double bonds of the eleostearic acid found in tung oil are in conjugation whereas the double bonds of the linoleic and linolenic acids of linseed oil are not. It is a principal object of the present invention to provide a relatively quick and inexpensive method of isomerizing polyunsaturated higher fatty acids to bring the double bonds thereof into conjugation so that the polyhydric alcohol esters thereof will have improved drying properties.

I have found that the double bonds of polyunsaturated higher fatty acids can be brought into conjugation within a few hours by heating an aqueous solution of the soaps thereof with excess alkali in a pressure vessel at temperatures above about 200° C. and under the corresponding autogenic pressures. I have found that by heating the acids at these temperatures in the form of a solution of their soaps in water the isomerization or rearrangement of the double bonds proceeds much faster than would otherwise be the case, and an equilibrium favoring a relatively high content of conjugated double bonds is reached in from one to three hours. The most favorable temperature range appears to be from 200° to 250° C., for above this range excessive losses of the acids by polymerization may occur.

Insofar as I have been able to determine, my invention is perfectly general in character and may be used for the isomerization of any unsaturated fatty acid or acids the molecules of which contain at least two non-conjugated double bonds. In most cases the isomerization treatment will be applied to mixed fatty acids only some of which are polyunsaturated as this is the form in which these acids are found in vegetable and fish oils of relatively high iodine values. It is an important advantage of the invention, however, that it can be applied with success to fatty acid mixtures containing relatively low percentages of non-conjugated, polyunsaturated fatty acids, as is the case in soya bean fatty acids, as well as to the more highly polyunsaturated fatty acid mixtures such as those of linseed oil.

My isomerization treatment is especially adapted for improving the drying properties of the polyhydric alcohol esters of the fatty acid mixtures obtained from such vegetable oils as linseed oil, soya bean oil, chia seed oil, perilla oil, poppy seed oil, cottonseed oil, sunflower seed oil and the like as well as the polyunsaturated fatty acids of fish oils, and other polyunsaturated fatty acids of 18 or more carbon atoms. As a practical matter the oils from which the fatty acids are obtained should have a relatively high iodine value, at least on the order of 110–130, as otherwise there are not sufficient polyunsaturated acids present to warrant the treatment. It should also be noted that there is no advantage in applying my isomerization process to eleostearic acid, or to oils such as tung oil or oiticica oil which contains large quantities of polyunsaturated acids having double bonds that are already in conjugation, although the treatment of such acids is not excluded from the invention in its broadest aspects. Thus, for example, I have heated a mixture of 75 parts by weight of tung oil acids, 75 parts of potassium hydroxide and 100 parts of distilled water in an autoclave at 225–230° C. for 2.5 hours and liberated the resulting isomerized fatty acids from their potassium soaps. The resulting amber colored acids were partly liquid at room temperature, whereas the original acids were crystalline, and fractionation of the isomerized acids by distillation at 250–300° C. under 1 mm. pressure followed by analysis of the fractions showed that the degree of triple conjugation characteristic of eleostearic acid had been substantially reduced while corresponding quantities of acids having only double conjugation had been formed. While this constitutes further proof that the conditions obtaining during the heating step brought about equilibrium favoring double conjugation, esterification of the isomerized tung oil acids with glycerine did not give as good a drying oil as the original tung oil.

In many cases it is feasible to subject higher fatty acid mixtures having a relatively low content of polyunsaturated fatty acids to a preliminary treatment that will separate out the more highly saturated fatty acids such as stearic acid, palmitic acid and the like. Thus, for example, the crude fatty acids obtainable by saponification of soya bean oil, upon refrigeration at about 4° to 12° below zero, centigrade, for 24 hours will crystallize out substantial quantities of stearic and palmitic acids, which can be removed by filtration, and the percentage of doubly unsaturated fatty acids in the remaining oil is of course increased substantially.

The content of fatty acids having conjugated double bonds can also be increased by vacuum distillation of the isomerized fatty acid mixtures. I have found that the acids in which conjugation has occurred have slightly higher boiling points at reduced pressures than the corresponding non-conjugated acids, so that fractions rich in conjugated acids can be separated by this method. Ordinarily a flash distillation is preferred, as considerable polymerization of the conjugated acids is encountered if they are maintained at elevated temperatures for too long a time.

Another feature of the invention which is important from a commercial point of view resides in the direct treatment of glyceride oils themselves by my alkali isomerization process. When such triglycerides as soya bean oil, linseed oil, perilla oil and the like are charged into an autoclave and heated with an aqueous solution of an alkali the oil is immediately saponified and the soaps of its fatty acids are formed. When the solution contains an excess of alkali over that necessary to saponify all the fatty acids and sufficient water to dissolve the resulting soaps it is unnecessary to carry out the saponification as a separate step, but the autoclave may be directly heated to 200-250° C. and the contents maintained at these temperatures until conjugation of the double bonds of the fatty acids is effected.

After the isomerization of the fatty acids has been effected by the above described or similar processes, drying oils of improved characteristics are obtained by esterifying the isomerized acids with a polyhydric alcohol. Any alcohol of this class having three or more esterifiable hydroxy groups may be used for this purpose, such as glycerol, pentaerythritol or dipentaerythritol. The process of isomerizing fatty acid mixtures containing polyunsaturated higher fatty acids to bring the double bonds thereof into conjugation followed by esterification with a polyhydric alcohol is a new and commercially feasible method of preparing synthetic drying oils of improved drying properties, and constitutes one of the most important features of my invention.

It should be understood that conjugation of all the double bonds present in polyunsaturated higher fatty acids is not usually obtained by the process of my invention. The point of equilibrium between the conjugated and non-conjugated acids seldom exceeds 50%, and therefore only about half of the dienic or polyenic acids of the oils are isomerized. However, the polyhydric alcohol esters of fatty acid mixtures that have been isomerized to this extent exhibit faster and better drying properties as well as heat-bodying characteristics than are possessed by the original oils from which these acids were obtained, and since the isomerization equilibrium can be attained rapidly in ordinary equipment this improvement is relatively inexpensive.

When my isomerization treatment is applied to the fatty acids of linseed oil and to dehydrated castor oil fatty acids, I find that the resulting fatty acid mixtures have very similar properties. By preparing the esters of the isomerized fatty acids from these two sources with glycerine, pentaerythritol and dipentaerythritol I have obtained new drying oils which contain about 40% of esterified octadecadienic acids in which the two double bonds are in conjugation. These oils have excellent drying properties, and are included as specific features of the present invention.

The invention will be illustrated in greater detail by reference to the following specific examples. The results obtained in these examples were evaluated by the spectroscopic method referred to in volume 37 of the Biochemical Journal, pages 138-141 (1937) and described in greater detail by the present applicant in Industrial and Engineering Chemistry, volume 32 (1940), page 963. By this means it was possible to make quantitative determinations of the content of doubly, triply and quadruply conjugated higher fatty acids in fatty acid mixtures within very narrow limits of error. It should be understod, however, that while these examples may describe in detail some of the more specific features of the invention, they are given primarily for purposes of illustration and the invention in its broader aspects is not limited thereto.

In Examples 2, 3, 4 and 7 some of the isomerized fatty acids have been described by name. It is quite possible, however, that the conjugated double bond systems of these acids may be one or two carbon atoms removed from the positions assigned, and therefore these examples should be regarded as indicative of the results obtained rather than as proof of the exact structural formulas of these compounds.

*Example 1*

75 parts by weight of linseed fatty acids, 75 parts by weight of 100% potassium hydroxide and 100 parts by weight of water were charged into a stainless steel bomb-type autoclave fastened in an electrically heated chamber mounted on a rocking device to provide continuous agitation. The degree of heating was thermostatically controlled and recorded by a recording pyrometer. The mixture was heated with agitation to 225° C. in 45 minutes, after which it coasted to 240° C. but dropped rapidly again to 225° C. where it was held for 1.75 hours. The autoclave was then opened and the soft soap and alkali dissolved in an excess of distilled water and decomposed by agitation with excess hydrochloric acid at the boiling point. The liberated fatty acids were again treated with hydrochloric acid to insure complete hydrolysis of the soaps, after which the product was again washed with distilled water and dried.

The refractive index of the product was 1.4782 at 25° C. as compared with the value of 1.4690 of the linseed fatty acids before the alkali treatment. When analyzed for doubly and triply conjugated double bonds by determining the ultraviolet absorption spectra in 0.2%-5% cyclohexane solutions the product was found to contain 34.6% of 9,11-octadecadienic acid and 7.66% of 10,12,14-octadecatrienic acid or conjugated isomers of these.

28 parts by weight of the isomerized fatty acid mixture was reesterified by heating with 10.2 parts of 95% glycerine in an atmosphere of carbon dioxide at 215–220° C. for 6 hours. The product was a clear yellow oil which air dried overnight when mixed with driers and flowed out on tin panels. Similar films hardened within a few hours when stoved at 100° C.

Example 2

100 parts by weight of soya bean fatty acids, 75 parts of potassium hydroxide and 110 parts of water were charged into the autoclave described in Example 1 and heated with agitation at 225° C. for 2.5 hours. Analysis of the fatty acids before and after the isomerization gave the following results:

|  | $n^{25°C}_D$ | 9,11-octadecadienic acid | 10,12,14-octadecatrienic acid |
| --- | --- | --- | --- |
|  |  | Per cent | Per cent |
| Before treatment | 1.4641 | 1.05 | 0.165 |
| After treatment | 1.4676 | 20.20 | 1.330 |

Samples of the isomerized fatty acid mixture were esterified with glycerine and with pentaerythritol by heating them at 215–225° C. with a 5% excess of the alcohol over that necessary to form the neutral ester. The drying properties of the triglyceride oil were considerably better than those of soya bean oil, which dries slowly to a soft film, while the pentaerythritol ester had even better drying properties than the triglyceride.

Example 3

75 parts by weight of linseed fatty acids, 75 parts of 100% sodium hydroxide and 125 parts of water were heated at 220–225° C. under 150–170 lbs. per sq. in. gage pressure for three hours and then cooled, dispersed in water, and treated with hydrochloric acid as before. The sodium soap was somewhat harder than the potassium soap of Example 1 and a little more difficult to hydrolyze, but otherwise the results were similar. The dried isomerized fatty acids had a refractive index of 1.4803 and contained 41.0% of 9,11-octadecadienic acid-1 and 8.2% of 10,12,14-octadecatrienic acid-1 or conjugated isomers thereof.

Example 4

100 parts by weight of fish-oil fatty acids (a product known commercially as Neo-Fat #19 acids) and 75 parts by weight of lithium hydroxide were charged into the autoclave of Example 1 together with 100 parts of water. The batch was heated at 215–220° C. for 3.5 hours after which the product was acidified, washed, and the fatty acids recovered in the usual manner. Analysis showed the materials before and after treatment to contain:

|  | $n^{25}_D$ | 9,11-octadecadienic acid | 10,12,14-octadecatrienic acid | Conjugated acid with 4 double bonds |
| --- | --- | --- | --- | --- |
|  |  | Per cent | Per cent | Per cent |
| Before treatment | 1.4797 | 3.13 | 1.7 | 0.14 |
| After treatment | 1.4906 | 23.20 | 8.0 | 2.30 |

The formation of a conjugated acid with four double bonds and a trace of a five double bonded acid distinguishes this from the preceding batches and is due to the fact that many fish oils (unlike most vegetable oils) contain substantial amounts of the more highly unsaturated acids.

When esterified with a small excess of glycerine the isomerized fish oil acids formed a triglyceride having excellent drying properties. An alkyd resin prepared by heating together 30 parts of phthalic anhydride, 19 parts of glycerine and 56 parts of the isomerized acids at 220° C. for 3.5 hours, dried rapidly at 90° C. when dissolved in mineral spirits and flowed on tin panels. The dried film had a frosted appearance similar to that obtained in tung oil formulations, which constituted further proof of conjugation of the double bonds.

Example 5

It is known that castor oil fatty acids can be dehydrated by heating at about 280° C., and that the resulting product contains about 15–30% of conjugated double bonds in the form of octadecadienic-9,11-acid-1. The following example shows that the content of conjugated double bonds can be greatly increased by applying the principles of the present invention.

75 parts by weight of dehydrated castor oil fatty acids, 75 parts by weight of lithium hydroxide and 100 parts of water were charged into the autoclave of Example 1 and heated with agitation. The temperature was raised to 220° C. in 45 minutes and held at 220–225° C. for three hours. The soaps were then recovered, hydrolyzed with HCl and water, washed free from mineral acid and dried over anhydrous calcium chloride. The refractive index of the acids before the treatment was $n^{25.6°C}_D = 1.4706$; after the treatment it was 1.4734. The recovered light amber-colored acids were distilled at 1–2 mm. of mercury yielding an almost water-white product of $n^{25}_D = 1.4731$ in 93% yield. Analysis of the alkali-treated, distilled acids by determining their absorption spectra showed them to contain 41.7% of conjugated double bonds as compared with 26.0% determined for the original acids by the same method.

Example 6

In all the foregoing examples sufficient alkali was used to form water-soluble soaps of the unsaturated fatty acids. The following example shows that isomerization is not obtained when this condition is not observed.

The autoclave of Example 1 was charged with 100 parts by weight of linseed fatty acids, 120 parts of water and only 5 parts of sodium hydroxide, which was just enough to form sufficient soap to emulsify the excess fatty acids in the water. This batch was heated in the autoclave at 220° C. for three hours and then hydrolyzed with acid, washed and recovered in the usual manner. The refractive index of the dried acids was 1.4690, which was identical with that of the starting material, from which it was apparent that no conjugated unsaturation had been developed.

Example 7

The content of conjugated isomers in the alkali isomerized fatty acids of my invention can be still further increased by vacuum distillation. Samples of the products of Examples 3 and 4 were distilled at 1 mm. of mercury absolute pressure and the following cuts obtained:

TABLE I

*Product of Example 3*

| Material | Per cent yield | $n^{25}_D$ | Description | n-Octadecanoic acid | |
|---|---|---|---|---|---|
| | | | | 9,11-dienic | 10,12,14-trienic |
| Original | | 1.4803 | Brown liquid and white solid | 41.0 | 8.2 |
| 1st cut to 170° C | 8 | 1.4635 | White solid | 23.0 | 3.1 |
| 2nd cut 170–180° C | 71 | 1.4715 | Water white liquid | 40.4 | 6.8 |
| 3rd cut 180–190° C | 7 | 1.4830 | Light yellow liquid | 43.1 | 18.8 |
| Residue | 10 | 1.4995 | Brown tar | | |

TABLE II

*Product of Example 4*

| Material | Per cent yield | $n^{25}_D$ | Description | n-Octadecanoic acid | | |
|---|---|---|---|---|---|---|
| | | | | 9,11-dienic | 10,12,14-trienic | More than 3 |
| Original | | 1.4797 | Amber liquid | 23.2 | 8.0 | 2.3 |
| 1st cut to 175° C | 10 | 1.4540 | Solid | 13.9 | 2.65 | 0.33 |
| 2nd cut 175–195° C | 56 | 1.4656 | Solid | | | |
| 3rd cut 195–210° C | 34 | 1.4691 | Lemon liquid | 25.6 | 6.0 | 0.84 |
| 4th cut 200–210° C | 4 | 1.4975 | Yellow liquid | 20.4 | 6.2 | 1.12 |
| Residue | 16 | | Brown tar | | | |

These tables show that a product containing 5 to 10% more doubly conjugated fatty acids can be obtained by separating the higher boiling fatty acids from those of lower boiling point by simple distillation. The relatively large quantities of tar indicate that much better and more efficient results are obtainable when pressures considerably lower than 1 millimeter of mercury are employed with a corresponding reduction in the distillation temperature and the amount of polymerization. Continuous distillation of the alkali isomerized fatty acids in a molecular still, for example, under a vacuum of 2 to 3 microns absolute mercury pressure will result in more complete separation of the various acids and in less loss by polymerization.

Example 8

The second and third cuts of Table I of Example 7, amounting to 78% of the total, were combined. 40 parts by weight of the mixture were heated with 4 parts of glycerine at 215° C. with continuous agitation while maintaining an atmosphere of carbon dioxide to avoid discoloration. After 5 hours the acid number of the batch was 25.3. Heating was then continued for an additional 1.75 hours whereupon a light-colored oil was obtained having an acid number of 23.25. This was heated to 220–240° C. for 20 minutes in order to remove free acid, after which the acid number was 7.8 and the refractive index at 25° C. was 1.4875.

10 gram samples of the resulting synthetic drying oil were mixed with 0.8 cc. of a drier containing 5% Pb and 0.5% Co. These samples were flowed out on tin panels, two of which were air dried while two more were baked at 100° C., both in comparison with similar panels coated with KVO linseed oil containing similar amounts of drier. The synthetic oil containing the isomerized fatty acids was found to have a faster initial set than the natural oil on air drying, while on the baked panels it seemed at first to be more tacky than the natural oil but finally, after continued baking, both oils cured to water-resistant films.

Example 9

Oil modified alkyd resins were made from representative drying oil acids before and after isomerization by heating together 56 parts by weight of the acid, 29.6 parts of phthalic anhydride and 18.8 parts of glycerol.

This mixture was heated in an atmosphere of carbon dioxide at 180–230° C. for 3.5 hours until the acid number of the product was about 29. Four resins were prepared in this manner having the following characteristics:

| Resin No. | Fatty acid used | Acid No. of solids | Viscosity (75% in xylene) |
|---|---|---|---|
| | | | *Poises* |
| 1 | Linseed | 34 | 1.40 |
| 2 | Isomerized linseed, Example 1 | 28 | 5.50 |
| 3 | Soya bean | 31 | 1.10 |
| 4 | Isomerized soya, Example 2 | 26 | 1.80 |

These resins were dissolved in approximately an equal weight of mineral spirits, flowed on tin panels, and stoved for half an hour without the addition of a drier. Resin 2 was found to set up faster than resin 1 and resin 4 set faster than resin 3, with better through dry and less tack. It is evident, therefore, that isomerized fatty acids prepared by the methods of the present invention are well suited for use in the preparation of drying resins.

Example 10

883 parts by weight of linseed fatty acids, isomerized and distilled by the method described in Example 3 and containing 31.4% higher fatty acids having singly conjugated double bonds and 7.3% of acids having triply conjugated double bonds, were esterified with 141 parts by weight of dipentaerythritol by heating at 200–205° C. for 6.75 hours. The crude esterification product had an acid number of 17.9 which, after two extractions with anhydrous ethanol, was reduced to 3.1.

This ester was tested for gelation in comparison with a dipentaerythritol ester of ordinary un-isomerized linseed acids, washed twice with anhydrous ethanol, and also with a commercial triglyceride ester of dehydrated castor oil fatty acids. 10 g. samples of the three synthetic oils in test tubes were prepared in an oil bath, the temperature of which was raised to 250° C. in one hour and thereafter maintained at 250° C. The results obtained are shown in the following table:

| Material | Time at 250° C. | Viscosity |
| --- | --- | --- |
| | Hours | |
| Isomerized linseed dipentaerythritol ester. | 3 | Firm gel. |
| Linseed dipentaerythritol ester | 5.5 | Z=22.7 poises. |
| Dehydrated castor oil triglyceride | 5.5 | U=6.27 poises. |

From the foregoing results it is evident that the dipentaerythritol ester of the isomerized linseed oil fatty acids, due to its extreme polyfunctionality and conjugated unsaturation, sets up much faster than the corresponding ester of ordinary linseed oil fatty acids, and that a much more completely polymerized product is obtained.

*Example 11*

Linseed oil fatty acids were isomerized by stirring together 100 parts by weight of the acids, 100 parts of water, and 25 g. of 85% potassium hydroxide until a soap paste was formed and heating in an agitated autoclave at 225° C. for 3.75 hours. The soaps were then hydrolyzed with hydrochloric acid at the boiling point of the aqueous solution and the fatty acids were separated, washed and dehydrated. The acids were then found to contain 33.1% of doubly conjugated and 11.5% of triply conjugated acids, whereas the original material had contained 1.81% and 0.253% respectively.

62 parts of these acids were mixed with 10.1 parts of dipentaerythritol and heated with agitation in an atmosphere of carbon dioxide. The temperature was carried to 180° C. in one hour, then to 200° C. during the second hour and maintained at this point for 5 hours longer, when the acid number was found to be 11.3. The ester was then extracted twice with anhydrous ethanol, recovered and dried. It had an acid number of 2.1, viscosity of Y (Gardner) and color of 4 (Hellige).

Upon addition of driers containing 0.5% Pb+0.05% Mn+0.005% Co as metal to oil and flowing out on a tin plate the ester was medium set in one hour, had a very slight tack for the next 4 hours, and was tack-free in 6 hours. After air drying for 24 hours it showed only a very slight whitening when immersed in distilled water.

This application is a continuation-in-part of my copending application, Serial No. 363,495, filed October 30, 1940.

What I claim is:

1. A method of producing fatty acids capable of forming polyhydric alcohol esters of improved drying properties from a mixture of fatty acids having an iodine number of at least 110 and a substantial content of unsaturated higher fatty acids which contain at least two non-conjugated double bonds, which comprises heating a reaction mixture consisting of a solution of soaps thereof and an excess of alkali in water in the absence of an added alcohol in a closed chamber for several hours at temperatures of 200–250° C. and under the corresponding autogenic pressure, whereby isomerization of said unsaturated higher fatty acids takes place and also a certain amount of polymerization, and then separating the acids of varying boiling points from the polymers by vacuum distillation at pressure not substantially greater than 1 mm. of mercury absolute pressure.

2. A method of producing fatty acids capable of forming polyhydric alcohol esters of improved drying properties from soya bean fatty acids which comprises heating a reaction mixture consisting of a solution of soya bean fatty acid soaps and an excess of alkali in water in the absence of an added alcohol in a closed chamber for several hours at temperatures of 200–250° C. and under the corresponding autogenic pressure, whereby isomerization of the more highly unsaturated fatty acids thereof takes place together with a certain amount of polymerization and then separating the acids of varying boiling points from the polymers by vacuum distillation at pressures not substantially greater than 1 mm. of mercury absolute pressure.

3. A method of producing fatty acids capable of forming polyhydric alcohol esters of improved drying properties from linseed fatty acids which comprises heating a reaction mixture consisting of a solution of linseed fatty acid soaps and an excess of alkali in water in the absence of an added alcohol in a closed chamber for several hours at temperatures of 200–250° C. and under the corresponding autogenic pressure, whereby isomerization of the more highly unsaturated fatty acids thereof takes place together with a certain amount of polymerization and then separating the acids of varying boiling points from the polymers by vacuum distillation at pressures not substantially greater than 1 mm. of mercury absolute pressure.

THEODORE F. BRADLEY.